United States Patent
Saund

(10) Patent No.: US 8,054,512 B2
(45) Date of Patent: Nov. 8, 2011

(54) SYSTEM AND METHOD FOR MAINTAINING PAPER AND ELECTRONIC CALENDARS

(75) Inventor: Eric Saund, San Carlos, CA (US)

(73) Assignee: Palo Alto Research Center incorporated, Palo Alto, CA (US)

(*) Notice: Subject to any disclaimer, the term of this patent is extended or adjusted under 35 U.S.C. 154(b) by 1050 days.

(21) Appl. No.: 11/881,883

(22) Filed: Jul. 30, 2007

(65) Prior Publication Data

US 2009/0034845 A1    Feb. 5, 2009

(51) Int. Cl.
*H04N 1/04*    (2006.01)

(52) U.S. Cl. ............... 358/473; 358/474; 358/478

(58) Field of Classification Search ........... 358/478, 358/473, 474
See application file for complete search history.

(56) References Cited

U.S. PATENT DOCUMENTS

| 6,217,076 B1* | 4/2001 | Howard et al. ............ 283/2 |
| 6,509,893 B1 | 1/2003 | Akhlagi et al. |
| 6,529,645 B2 | 3/2003 | Fåhraeus et al. |
| 6,563,951 B2 | 5/2003 | Fåhraeus et al. |
| 6,906,699 B1 | 6/2005 | Fåhraeus et al. |
| 6,985,643 B1 | 1/2006 | Fåhraeus et al. |
| 7,162,087 B2 | 1/2007 | Bryborn |
| 7,221,810 B2 | 5/2007 | Andreasson et al. |
| 2002/0002539 A1 | 1/2002 | Fåhraeus et al. |
| 2002/0079371 A1* | 6/2002 | Bobrow et al. ............ 235/454 |
| 2007/0245234 A1* | 10/2007 | Ko ............................ 715/513 |

FOREIGN PATENT DOCUMENTS

| EP | 1 269 289 B1 | 5/2006 |
| EP | 1 698 994 A2 | 9/2006 |
| WO | WO 99/60468 | 11/1999 |
| WO | WO 99/60469 | 11/1999 |
| WO | WO 01/71461 A1 | 9/2001 |
| WO | WO 03/036559 A1 | 5/2003 |
| WO | WO 03/056487 A1 | 7/2003 |

* cited by examiner

*Primary Examiner* — Houshang Safaipour
(74) *Attorney, Agent, or Firm* — Fay Sharpe LLP

(57) ABSTRACT

The presently described embodiments solve the problem of getting electronic calendar entries back onto the paper calendar. To do so, in one form, according to the presently described embodiments, an inkjet label printer is mounted next to the paper calendar. Each time a daily entry gets updated online, the label printer prints out a new sticky label whose size and markings correspond to the revised paper calendar entry for that day. It is then a simple process for the user to peel off the label and affix it to the correct location on the paper calendar.

23 Claims, 6 Drawing Sheets

FIG. 2A
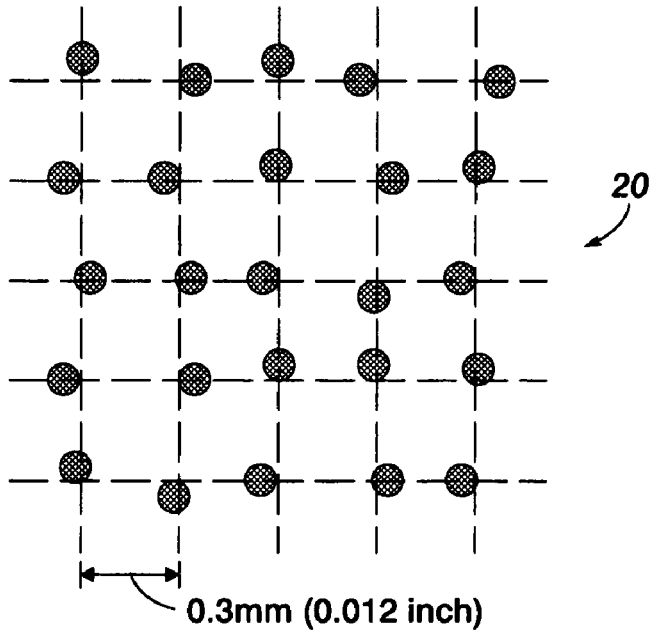
0.3mm (0.012 inch)
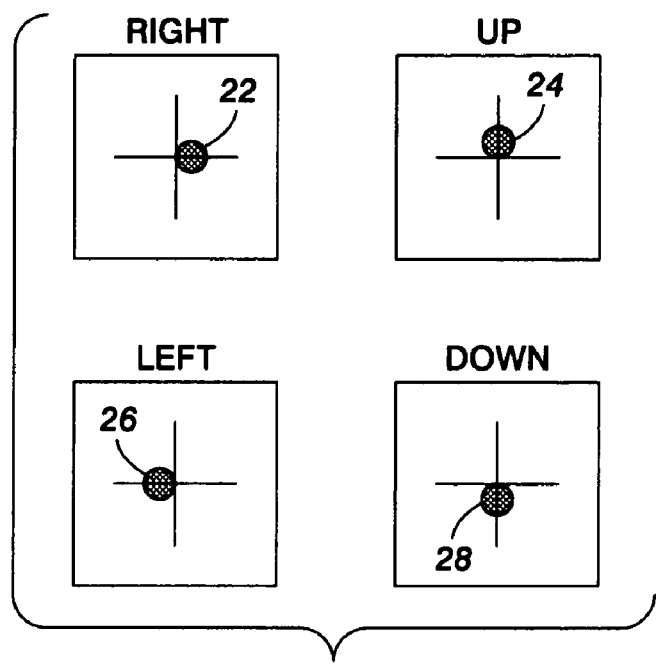
FIG. 2B

SYSTEM AND METHOD FOR MAINTAINING PAPER AND ELECTRONIC CALENDARS

BACKGROUND

Manual and electronic calendars are widely used. However, it is difficult to maintain synchrony between such calendars, some of which are annotated on paper, others of which are maintained online in computer calendar applications and mobile communication devices such as personal digital assistants (PDAs). This is particularly true in a family environment, for example, whereby a central family calendar is typically kept in one room, e.g. the kitchen, and marked-up and referred to by family members as they work out scheduling among themselves and while on the telephone. As such, there is difficulty maintaining synchrony of calendar entries between the central paper calendar and individual family members' electronic calendars maintained on, for example, their computers, PDAs, and mobile phone digital calendaring applications.

There are known solutions to the problem; however, none are particularly convenient for the typical user of both a traditional calendar and an electronic calendar. For example, one could use only electronic calendars. However, this approach does not address the practical reality of, for example, the home environment where more traditional, manual calendars are pervasive. One might also use purely passive paper calendars, and periodically synchronize with electronic calendars by a) hand-writing electronic calendar entries onto the paper calendar, or b) hand-entering paper calendar entries into electronic calendars. This approach is inconvenient and cumbersome to the users of both types of calendars. Moreover, it is subject to a high degree of human error and inconsistency.

In addition, another approach is to print calendars, such as a calendar 10 of FIG. 1, on paper printed with an address carpet, such as the Anoto dot pattern (described in connection with FIGS. 2(A) and 2(B)). When the calendar is marked with a suitable digital pen, such as an Anoto pen (generally described in connection with FIG. 3), the digital ink entries can be transferred to the corresponding dates and times on electronic calendars (not shown). This, of course, permits automatic or semi-automatic updating of electronic calendar entries from paper using, for example, digital ink recognition. However, hand-writing of electronic calendar entries onto the paper calendar is still required. This, too, is inconvenient and cumbersome, and is subject to a high degree of human error and inconsistency.

To further explain operation of a system of this type, with reference back to FIG. 2(A), address carpets allow digital tracking and recording of pen markings on physical paper. As shown, an array 20 of dots is configured in a grid pattern in a non-repeating manner so that each portion of the pattern has a unique dot pattern within its grid. This unique dot pattern provides an address for selected portions of the grid pattern. As is apparent from FIG. 2(B), the unique pattern is established by placing the dot in one of a plurality of positions relative to intersections of the grid. As shown, dot 22 is positioned to the right of the intersection. Dot 24 is positioned "up." Dot 26 is positioned to the left of the intersection. And, dot 28 is positioned "down." In this way, the Anoto dot pattern denotes two-dimensional location on a page by the displacement of dots from a regular grid.

A pen 30 is shown in FIG. 3. The components of the pen may vary and be configured in a variety of suitable manners within and about the pen 30, and is merely representatively shown for ease of reference. However, typically, the pen 30 includes a camera 32, a processor 34 and a memory 36. A battery 38 and wireless transceiver 40 are also housed within the pen 30. Of course, these items support the electronic nature of the pen. To accommodate the manual writing features of the pen 30, an ink cartridge and force sensor unit is provided. In operation, digital ink information can be obtained by the pen 30 through use of these components and then uploaded to a processor (not shown) for inclusion on an electric calendar via the wireless transceiver 40. Handwriting recognition software is, in many cases, able to perform character recognition to convert written text to ASCII symbols. In case handwriting recognition is unsuccessful or of low confidence, the raw digital ink can be transmitted and displayed. In any event, however, this system does not solve the problem of placing electronic calendar entries back onto a paper calendar.

BRIEF DESCRIPTION

In one aspect of the presently described embodiments, a system comprises a first calendar upon which manual entries are made on portions of the first calendar corresponding to specified time periods, an electronic calendar module operative to support a second calendar within which electronic entries are made, the second calendar defining data entry areas corresponding to the specified time periods, and, a printer operative to receive at least one electronic entry from the electronic calendar module for at least one specified time period and to print a label corresponding to the at least one specified time period, the label including printed data representing the electronic entry.

In another aspect of the presently described embodiments, the system further comprises a digital pen operative to gather data on manual entries.

In another aspect of the presently described embodiments, the system further comprises a docking station operative to receive the digital pen, retrieve the data and communicate the data to the electronic calendar module.

In another aspect of the presently described embodiments, the electronic entries are made via input from a keyboard or input from the digital pen.

In another aspect of the presently described embodiments, the digital pen is operative to wirelessly communicate with the electronic calendar module.

In another aspect of the presently described embodiments, the first calendar and the label include a digital address carpet.

In another aspect of the presently described embodiments, the first calendar includes a digital address carpet.

In another aspect of the presently described embodiments, the printer is operative to print a portion of the digital address carpet.

In another aspect of the presently described embodiments, the electronic calendar module is housed within a mobile communication device.

In another aspect of the presently described embodiments, the electronic calendar module is housed within a personal computer.

In another aspect of the presently described embodiments, the electronic calendar module is operative to communicate with a mobile communication device.

In another aspect of the presently described embodiments, the printer is operative to communicate wirelessly with the electronic calendar module.

In another aspect of the presently described embodiments, the electronic calendar module is operative to send a notification that a label has been printed.

In another aspect of the presently described embodiments, the notification is an audio notification.

In another aspect of the presently described embodiments, the notification is an e-mail notification.

In another aspect of the presently described embodiments, the electronic calendar module is operative to invoke an advertisement service related to the electronic entries.

In another aspect of the presently described embodiments, the method comprises retrieving electronic entries made in an electronic calendar, transmitting the electronic entries to a printer, and printing a label corresponding to the electronic entry for a specified time period.

In another aspect of the presently described embodiments, the label is applied to a calendar upon which manual entries are made.

In another aspect of the presently described embodiments, the method further comprises notifying users of the printing.

In another aspect of the presently described embodiments, the notifying is accomplished via e-mail messaging.

In another aspect of the presently described embodiments, the notifying is accomplished via audio notification.

In another aspect of the presently described embodiments, the method further comprises sending advertising material related to the electronic entries to a user via e-mail or audio notification.

In another aspect of the presently described embodiments, the method further comprises printing advertising material related to the electronic entries.

BRIEF DESCRIPTION OF THE DRAWINGS

FIGS. 2(A) and 2(B) illustrate a known type of address carpet;

DETAILED DESCRIPTION

The presently described embodiments address the deficiencies of the above-described systems. The partial solution noted above uses a digital ink capture technology when writing on the paper calendar, so that anything entered on it can be converted to electronic form and sent as update operations to electronic calendars. In one form noted above, the physical paper calendar is printed with address carpet dots (such as the Anoto pattern), and users mark on the calendar with a digital ink capture pen, such as an Anoto-type pen.

The presently described embodiments solve the problem of placing electronic calendar entries back onto the paper calendar. To do so, according to one form of the presently described embodiments, a printer, such as an inkjet label printer, is disposed near a paper calendar. Each time a daily entry gets updated online, the label printer prints out a new sticky label whose size and markings correspond to the revised paper calendar entry for that day. Of course, the printing of a label may occur more or less frequently to suit the needs and/or objectives of the users. For example, such printing may only occur when a cluster of electronic entries is available, or when a person (detected by any of a variety of different types of sensors that may be associated with the system, for example) is in close proximity to the system. It is then a simple process for the user to peel off the label and affix it to the correct location on the paper calendar. In one form, the label printer will print calendar entries along with background address carpet marks corresponding to particular date entries on the calendar.

Figure 4:
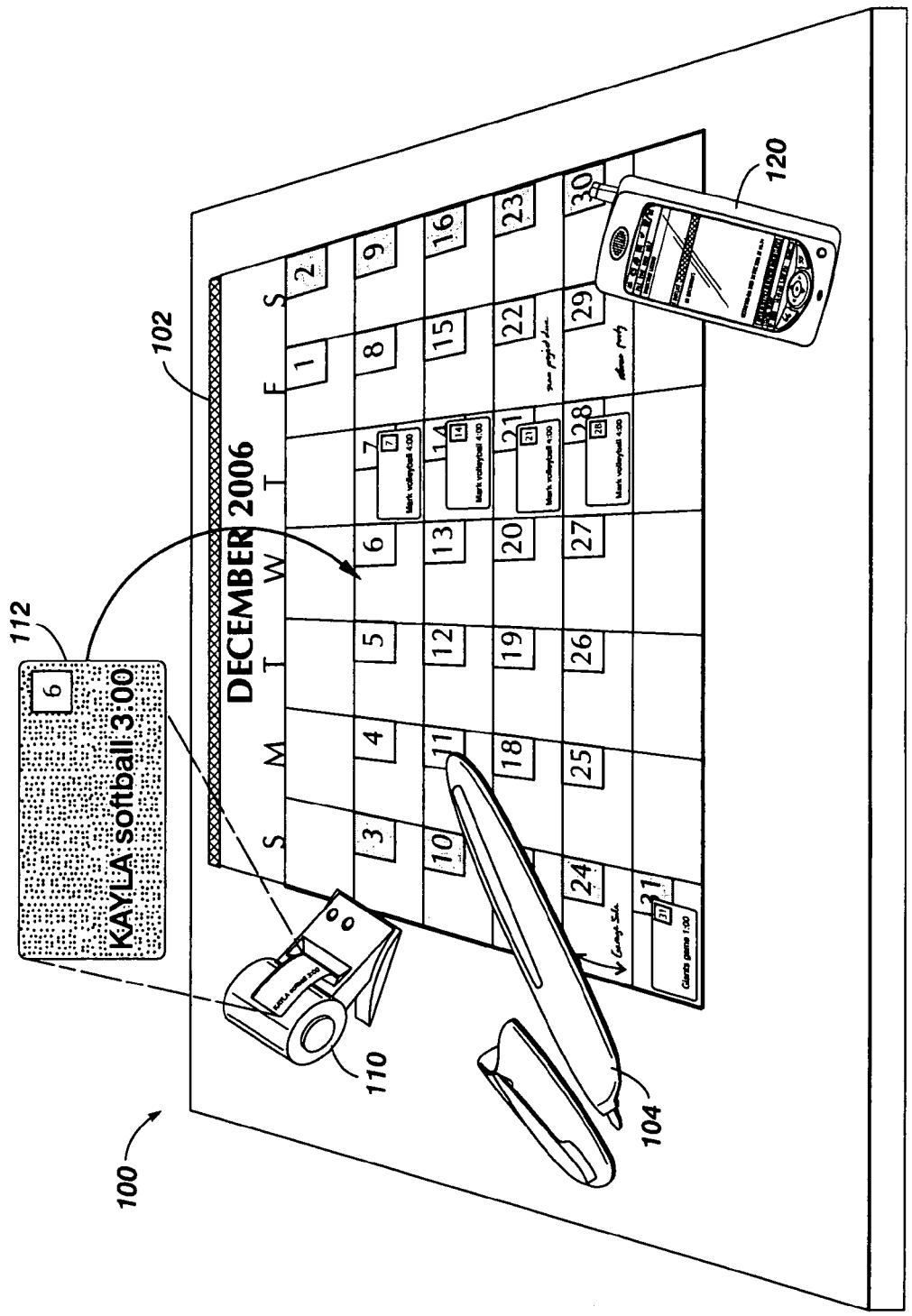
FIG. 4 is a system according to the presently described embodiments.

With reference now to FIG. 4, an example system 100 according to the presently described embodiments is illustrated. The system 100 includes a physical calendar 102 along with an associated digital pen device 104. It should be appreciated that the calendar 102 may, as noted above, include an address carpet to facilitate the use of the pen 104. However, an address carpet may not be required, depending on the digital pen system that is used. Also shown in the system is a printer, such as a label printer, 110 that prints labels 112. It should be appreciated that the label 112 may include a date, a calendar entry and the address carpet dot pattern noted above. In such a case, the address carpet dot pattern may exactly match that for the portion of the calendar upon which the label will be placed, or may be a different dot pattern. If it is a different dot pattern than the portion of the calendar upon which the label will be placed, the system simply will keep track of the differences. Also shown in the system 100 is a mobile device 120.

In operation, handwritten entries written with the digital ink pen 104 are sent to a processor (not shown), analyzed, and automatically prepared as ASCII or digital ink entries to be synchronized with electronic programs and devices. The system 100 also addresses the situation where entries are first made in the electronic calendar through, for example, the mobile device 120. In an example situation, a user of the system makes an entry on the mobile device 120 for November 6, stating "Kayla softball 3:00." When the mobile device 120 (and, consequently, the new entry) is brought into communication with the system, the label printer 110 prints out a sticker or label 112 for updating this date on the paper calendar. The label 112 is printed with address carpet markings so that any updates or additions to this date can be captured by the digital ink pen and transmitted to the PDA or other computer-based calendars for further processing.

Figure 5:
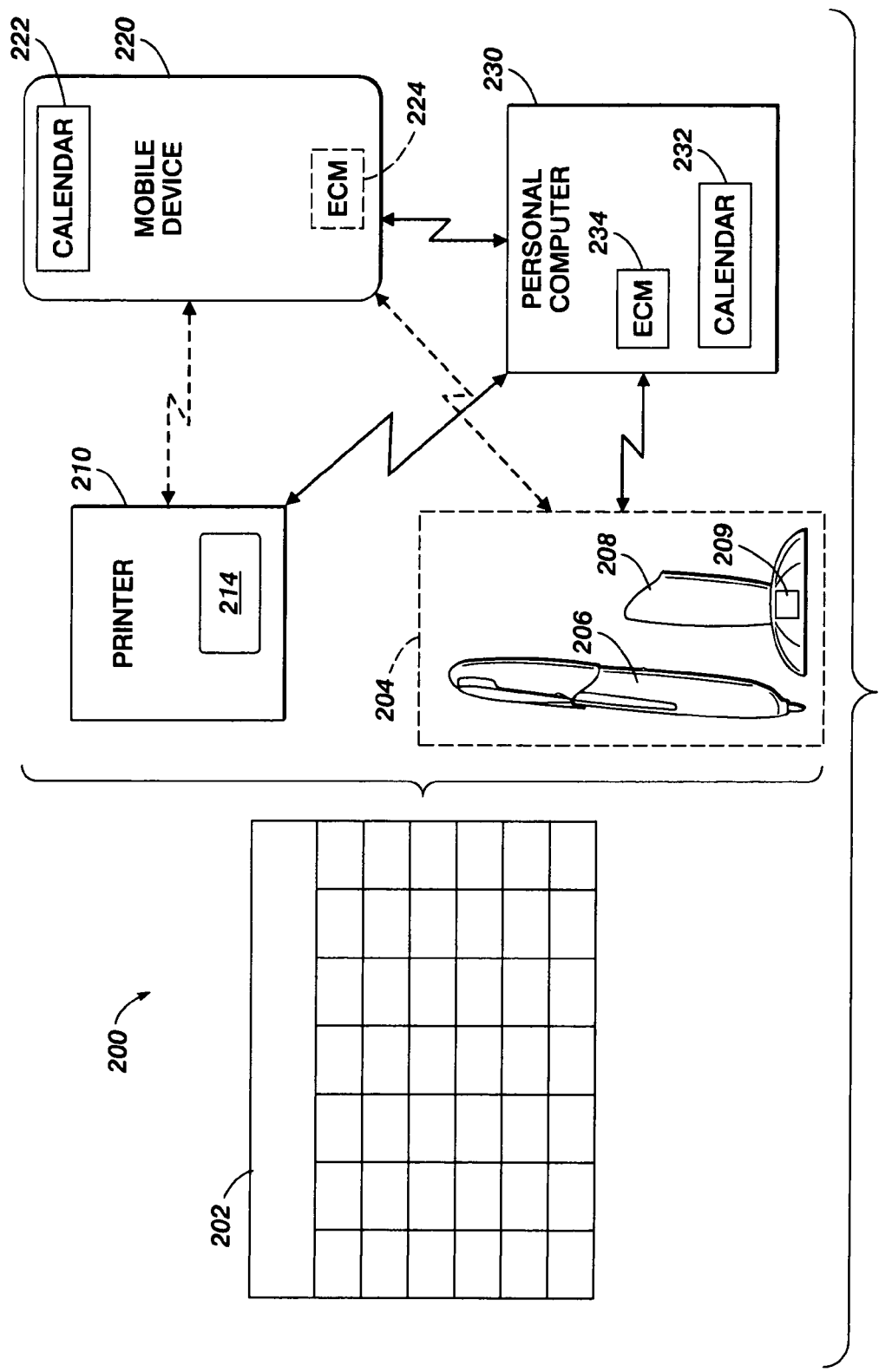
FIG. 5 is a block diagram of a system according to the presently described embodiments; and, FIG. 6 is a flow chart according to the presently described embodiments.

With reference now to FIG. 5, a system similar to that of FIG. 4, showing additional and modified components, is illustrated. As shown, the system 200 includes a paper or physical calendar 202 that can be modified using a pen system 204.

It should be appreciated that the calendar 202 is configured such that manual entries may be made thereon in portions of the calendar corresponding to specific time periods, such as days or weeks. This calendar can be a paper calendar and operate as described above in connection with the Anoto system. The calendar 202 could also take a variety of other forms. For example, the calendar 202 may take the form of a whiteboard-type calendar or a chalk board type calendar. In these cases, the printed labels may take the form of thin magnetic paper or thin plastic with adhesive qualities, instead of paper with an adhesive backing.

It should be understood that the calendar 202 will, in one form, include a digital address carpet that assists the digital pen system 204 in recognizing writing thereon. When a label is printed from the printer 210, the printer may print a suitable portion of the digital address carpet that will be applied to the calendar. Of course, as an alternative, the digital address carpet may be pre-printed on the labels. In this case, the label may not exactly duplicate the address carpet upon which it will be placed. So, the system will simply maintain (e.g. in table form) an index identifying these new address carpet portions that are being used for particular time periods.

Figure 1:
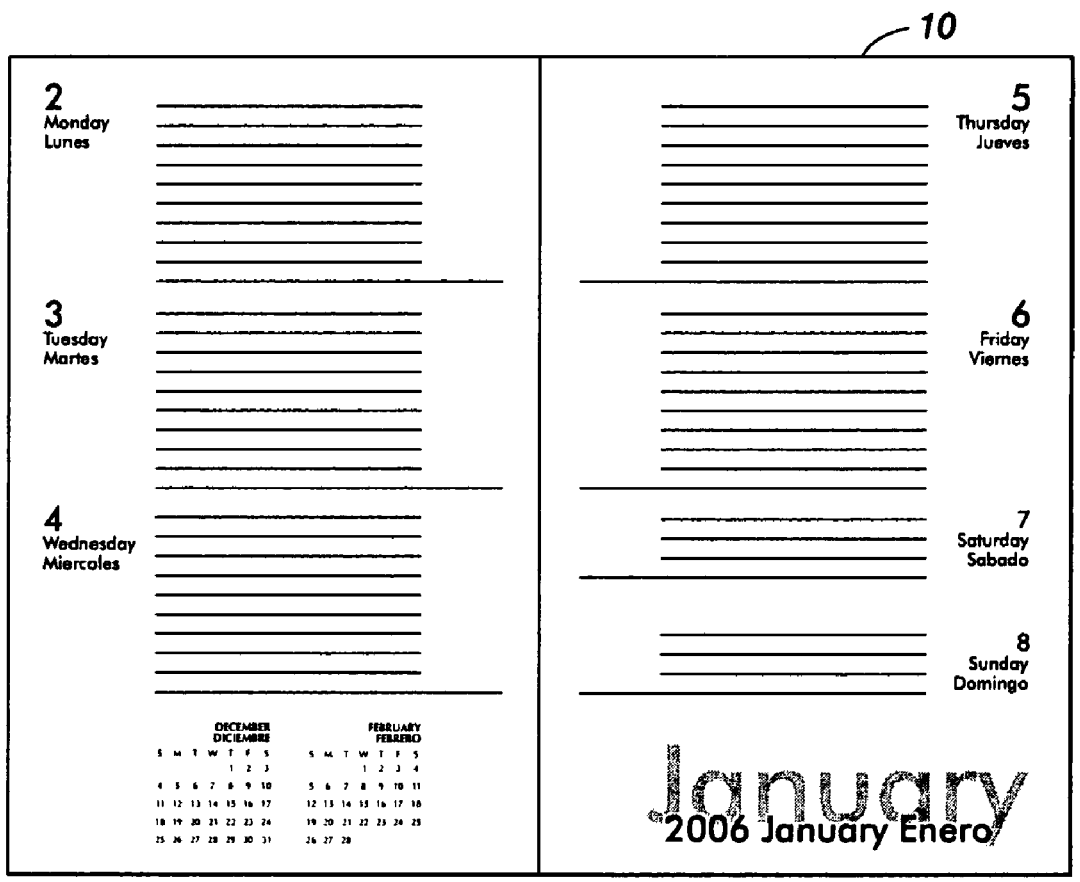
FIG. 1 is a view of a known type of electronic calendar.
Figure 3:
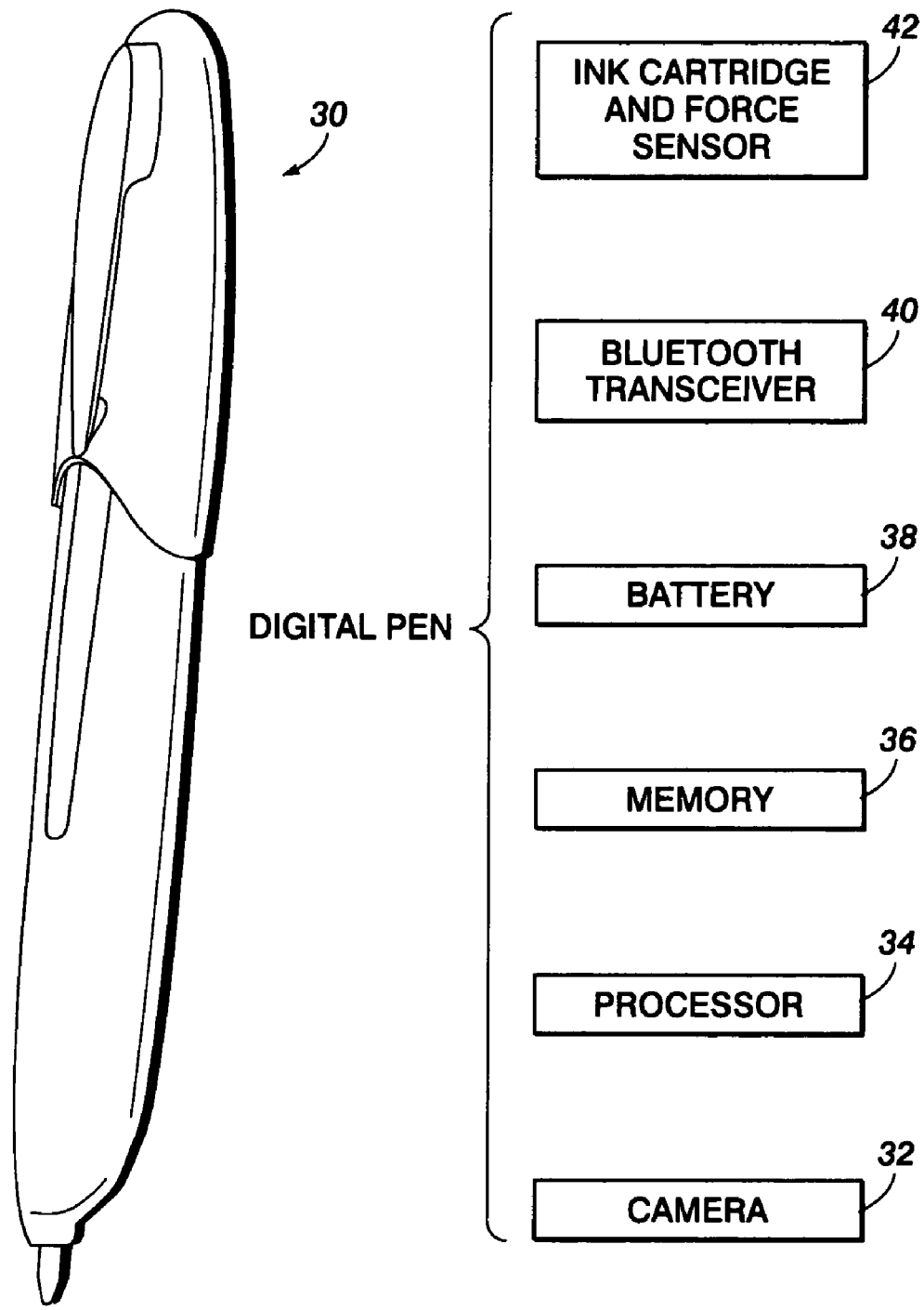
FIG. 3 is a cross-sectional view of a known type of digital pen.

The digital pen system 204 includes a pen 206 and, as an option, a docking station 208. It should be appreciated that the docking station may include a wireless transceiver 209 to communicate with other components in the system. However, as with the pen system shown in FIG. 3, the wireless transceiver may simply be incorporated within the pen, thereby negating the need for a docking station.

In any event, the digital pen system 204 is operative to gather data on the manual entries entered in the calendar 202. In the case where the digital pen system 204 includes a docking station 209, the docking station is operative to receive the digital pen 206, retrieve data and communicate the data to the electronic calendar module 234 (or 224), as described below. The electronic entries that are retrieved for subsequent printing on a label could include either entries input from a keyboard or entries previously input from the digital pen, or both.

Also shown in system 200 is a printer 210 having a wireless transceiver 214 that communicates with other components in the system 200. The printer 210, which may take the form of a variety different types of printers such as a label printer, is operative to receive at least one electronic entry from the electronic calendar module for at least one specified time period and to print a label corresponding to the at least one specified time period, the label including printed data representing the electronic entry.

A mobile device 220 is illustrated. The mobile device may take a variety of forms but, in at least one form, has a calendar system 222 thereon and, optionally, an electronic calendar module 224 that allows the mobile device calendar system 222 to communicate with other components of the system 200.

A personal computer 230 is illustrated as having an electronic calendar system 232 along with an electronic calendar module 234. The personal computer may take a variety of forms and may be replaced by any suitable processing system. Likewise, the calendar system 232 and electronic calendar module 234, which allows the calendar system 232 to communicate with other components within the system, may take a variety of forms.

The electronic calendar module 234 is operative to support the electronic calendar 232. Electronic calendar 232 is operative to have entries made therein. Such entries are typically made within data entry areas corresponding to specified time periods, such as days or weeks.

It should also be understood that the electronic calendar module 234 (or 224) is operative to perform the functionality described herein and may be housed within the personal computer holding the calendar, or a mobile device holding the calendar system. In some forms, the module will be housed within both the computer and the mobile device, depending on the configuration selected.

Figure 6:
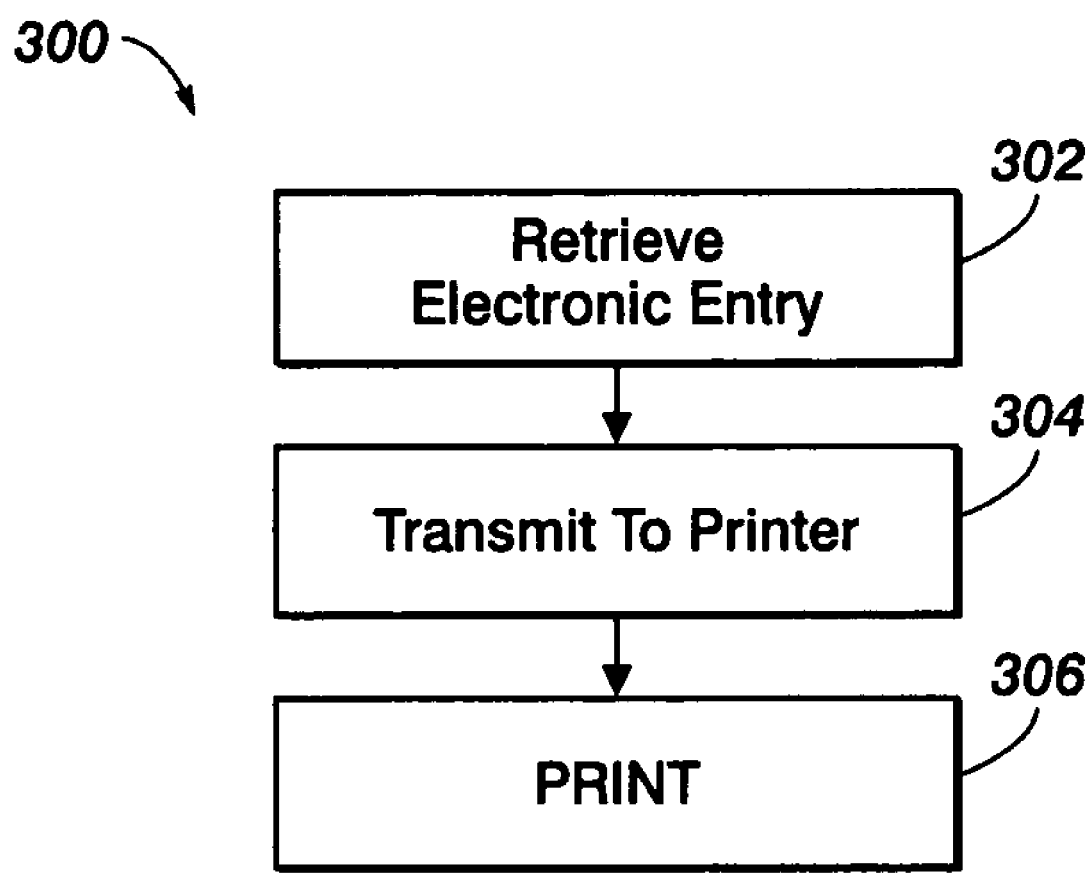

With reference now to FIG. 6, the basic routine that may be run by the electronic calendar module takes the form of a method 300. In the method 300, a step for retrieving electronic entries by the electronic calendar module (at 302) is first accomplished. It should be appreciated that this could be accomplished using a variety of suitable techniques. For example, if new electronic calendar data entries are available in the system, the system may signal the electronic calendar module, which then initiates the retrieval process. If the calendar is mobile, and the system is configured such that the only computer 230 includes an electronic calendar module, the electronic calendar module may continuously interrogate the local area for a mobile device with a new entry for which a label should be printed. It should be understood that, in the case of a computer based calendar and mobile based calendars within the same system, a process for synchronizing all devices should be implemented. One manner of doing so is to require all changes to be had through the electronic calendar module resident on the computer 230, as opposed to any other electronic calendar modules that may be present in the system.

It should also be appreciated that the electronic entries that are retrieved could vary, depending on the configuration of the system. For example, the electronic entries that are retrieved could include both the existing entries for a particular date as well as the recently added electronic changes. In this case, the label that is ultimately printed would cover the entire time period (e.g. day) on the corresponding paper calendar. The retrieved electronic entry may also only include the entry corresponding to the new or revised electronic material. In this case, the printed label may only be used to cover a portion of the time period on the corresponding paper calendar.

It should be understood, that the retrieved electronic entries are also converted to a form, if necessary, for transmission by the electronic calendar module. If a suitable printer is connected or within an appropriate range (in the case of a wireless printer), the retrieved electronic entries are then transmitted to the printer (at 304).

The printer then prints a label corresponding to the calendar date for which the electronic entry was made (at 306). As noted above, the form of the printing may vary from application to application. For example, the labels may or may not include a digital address carpet.

It should be appreciated that the routine described in connection with FIG. 6, as well as any other routines that may be implemented according to the presently described embodiments, may take a variety of configurations. For example, a variety of different hardware configurations and/or software routines may be implemented to achieve the objectives of the presently described embodiments. Also, the electronic calendar module may be a separate component from the calendar system or may be integrated within the calendar system or the processing system upon which calendar system is placed. In some forms, the electronic calendar module may not be a separate component or element.

The system 200 and the system 100 have generally been described as utilizing wireless connections between the components of the systems. However, it should be understood that wired connections between at least some of the components may also be implemented. For example, in the system 200, the label printer may be wired to the computer 230. As a further example, the docking station 208 may likewise be wired to the computer 230.

A further enhancement is a device for notification of the availability of calendar updates, to let users know when new sticker overlay labels are available for printing due to someone's electronic calendar getting updated. This notification could be implemented in a variety of forms, including audio notification and e-mail notification. Both types of notification could be implemented using a trigger message upon printing. The trigger message would invoke the electronic calendar module to send, through the system with which it is associated (e.g. system 200 of FIG. 5), a voice message or e-mail message (or other convenient message type) to all users indicating the printing of a new label.

A further enhancement of the invention is to link calendar entries with advertisements and service offerings, or other material related to the electronic entries. For example, a calendar entry for "Symphony 7:00 pm" may, through the electronic calendar module and/or its associated system (e.g. system 200 of FIG. 5), trigger or invoke an advertisement service that sends an email notification or an audio notification to the user about dinner specials at restaurants near the symphonic hall for that person's city. In this regard, the contemplated calendar entry could be an electronic entry or an entry made with the digital pen on the physical calendar. In other forms, the trigger for the sending of such notification may also be the printing of the label, as contemplated herein. Of course, other suitable material may also be printed upon the completion of a triggering event. For example, a coupon (or advertisement, . . . etc.) may print after the calendar label is printed. Concurrent printing on another printer may also be incorporated into the contemplated technique. For example, a map or menu may more suitably be printed on another printer on larger paper than is available for a label-type printer.

The label printer should be able to print in the appropriate inks for the digital ink system used. For the Anoto system, the background markings are typically printed using a carbon-based ink or toner, while foreground markings use non-carbon dyes.

A further enhancement of the system includes custom printed calendars pre-printed with not only address carpet markings, but also family- or workgroup-specific entries such as birthdays and school events.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for synchronizing calendars, the system comprising:
    a first calendar upon which manual entries are made on portions of the first calendar corresponding to specified time periods;
    an electronic calendar module operative to support a second calendar within which electronic entries are made, the second calendar defining data entry areas corresponding to the specified time periods; and,
    a printer operative to receive an electronic entry from the electronic calendar module for a specified time period and to print a label corresponding to the specified time period, the label including printed data representing the electronic entry.

2. The system as set forth in claim 1 further comprising a digital pen operative to gather data on manual entries.

3. The system as set forth in claim 2 further comprising a docking station operative to receive the digital pen, retrieve the data and communicate the data to the electronic calendar module.

4. The system as set forth in claim 2 wherein the electronic entries are made via input from a keyboard or input from the digital pen.

5. The system as set forth in claim 2 wherein the digital pen is operative to wirelessly communicate with the electronic calendar module.

6. The system as set forth in claim 1 wherein the first calendar and the label include a digital address carpet.

7. The system as set forth in claim 1 wherein the first calendar includes a digital address carpet.

8. The system as set forth in claim 7 wherein the printer is operative to print a portion of the digital address carpet.

9. The system as set forth in claim 1 wherein the electronic calendar module is housed within a mobile communication device.

10. The system as set forth in claim 1 wherein the electronic calendar module is housed within a personal computer.

11. The system as set forth in claim 10 wherein the electronic calendar module is operative to communicate with a mobile communication device.

12. The system as set forth in claim 1 wherein the printer is operative to communicate wirelessly with the electronic calendar module.

13. The system as set forth in claim 1 wherein the electronic calendar module is operative to send a notification that a label has been printed.

14. The system as set forth in claim 13 wherein the notification is an audio notification.

15. The system as set forth in claim 13 wherein the notification is an e-mail notification.

16. The system as set forth in claim 1 wherein the electronic calendar module is operative to invoke an advertisement service related to the electronic entries.

17. A method for synchronizing calendars, the method comprising:
    retrieving electronic entries made in an electronic calendar;
    transmitting the electronic entries to a printer; and,
    printing a label corresponding to an electronic entry for a specified time period.

18. The method as set forth in claim 17 wherein the label is applied to a calendar upon which manual entries are made.

19. The method as set forth in claim 17 further comprising notifying users of the printing.

20. The method as set forth in claim 17 wherein the notifying is accomplished via e-mail messaging.

21. The method as set forth in claim 17 wherein the notifying is accomplished via audio notification.

22. The method as set forth in claim 17 further comprising sending advertising material related to the electronic entries to a user via e-mail or audio notification.

23. The method as set forth in claim 17 further comprising printing advertising material related to the electronic entries.

* * * * *